(12) United States Patent
Begeja et al.

(10) Patent No.: US 8,386,253 B2
(45) Date of Patent: *Feb. 26, 2013

(54) SYSTEMS, METHODS, AND PROGRAMS FOR DETECTING UNAUTHORIZED USE OF TEXT BASED COMMUNICATIONS

(75) Inventors: Lee Begeja, Gillette, NJ (US); Benjamin J. Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,534

(22) Filed: Jul. 13, 2012

(65) Prior Publication Data

US 2012/0284017 A1 Nov. 8, 2012

Related U.S. Application Data

(63) Continuation of application No. 11/315,220, filed on Dec. 23, 2005, now Pat. No. 8,244,532.

(51) Int. Cl.
*G10L 17/00* (2006.01)
*H04M 15/00* (2006.01)

(52) U.S. Cl. .......... 704/250; 704/273; 379/114.14; 379/88.02; 379/189; 380/247; 726/26

(58) Field of Classification Search .......... 704/273, 704/250; 379/114.14, 88.02, 189; 380/247; 726/26

See application file for complete search history.

(56) References Cited

U.S. PATENT DOCUMENTS

| | | | |
|---|---|---|---|
| 5,504,810 A * | 4/1996 | McNair | 379/189 |
| 5,509,075 A * | 4/1996 | Grube et al. | 380/250 |
| 5,907,602 A * | 5/1999 | Peel et al. | 379/114.14 |
| 6,161,130 A | 12/2000 | Horvitz et al. | |
| 6,330,546 B1 | 12/2001 | Gopinathan et al. | |
| 6,334,121 B1 | 12/2001 | Primeaux et al. | |
| 6,490,560 B1 | 12/2002 | Ramaswamy et al. | |
| 6,601,048 B1 | 7/2003 | Gavan et al. | |
| 7,032,007 B2 * | 4/2006 | Fellenstein et al. | 709/206 |
| 7,035,386 B1 * | 4/2006 | Susen et al. | 379/93.02 |
| 7,142,651 B2 * | 11/2006 | Ronen et al. | 379/114.14 |
| 7,146,404 B2 * | 12/2006 | Kay et al. | 709/206 |
| 7,197,560 B2 * | 3/2007 | Caslin et al. | 709/224 |
| 7,506,054 B1 | 3/2009 | Fuh et al. | |
| 7,634,810 B2 * | 12/2009 | Goodman et al. | 726/22 |
| 7,686,214 B1 | 3/2010 | Shao et al. | |
| 7,707,108 B2 * | 4/2010 | Brown et al. | 705/40 |
| 7,760,861 B1 * | 7/2010 | Croak et al. | 379/114.14 |
| 7,853,989 B2 * | 12/2010 | Katsikas | 726/3 |
| 2003/0074410 A1 | 4/2003 | Kay et al. | |
| 2003/0185361 A1 * | 10/2003 | Edwards | 379/114.14 |
| 2004/0078447 A1 | 4/2004 | Malik et al. | |
| 2005/0160280 A1 | 7/2005 | Caslin et al. | |
| 2005/0185779 A1 | 8/2005 | Toms | |
| 2005/0198173 A1 | 9/2005 | Evans | |
| 2005/0204012 A1 | 9/2005 | Campbell | |
| 2005/0216564 A1 * | 9/2005 | Myers et al. | 709/206 |
| 2005/0243984 A1 * | 11/2005 | Mahone et al. | 379/114.14 |
| 2005/0273333 A1 * | 12/2005 | Morin et al. | 704/247 |
| 2005/0282529 A1 * | 12/2005 | Thorson et al. | 455/415 |

(Continued)

*Primary Examiner* — Jialong He

(57) ABSTRACT

Systems, methods, and programs for generating an authorized profile for a text communication device or account, may sample a text communication generated by the text communication device or account during communication and may store the text sample. The systems, methods, and programs may extract a language pattern from the stored text sample and may create an authorized profile based on the language pattern. Systems, methods, and programs for detecting unauthorized use of a text communication device or account may sample a text communication generated by the device or account during communication, may extract a language pattern from the audio sample, and may compare extracted language pattern of the sample with an authorized user profile.

20 Claims, 4 Drawing Sheets

U.S. PATENT DOCUMENTS

2006/0123133 A1* 6/2006 Hrastar ......................... 709/238
2006/0149674 A1* 7/2006 Cook et al. ..................... 705/44
2006/0168059 A1 7/2006 Chang et al.

* cited by examiner

US 8,386,253 B2

SYSTEMS, METHODS, AND PROGRAMS FOR DETECTING UNAUTHORIZED USE OF TEXT BASED COMMUNICATIONS

This application is a continuation of U.S. patent application Ser. No. 11/315,220, filed on Dec. 23, 2005, which is incorporated by reference herein in its entirety.

BACKGROUND

The use of streaming text messaging and short text message systems is steadily increasing as a method of electronic communication. As the number of devices capable of such communication and the number and size of such service providers increases, the more such devices and service accounts are being accessed and exploited by unauthorized users, for example, to impersonate the authorized user, obtain free communication, steal an authorized user's identity, and/or to cheat at online gambling.

Conventionally, methods are available to evaluate text based on models to predict a source of the text. For example, such methods are employed in Bayesian-type e-mail filters used to detect "spam" e-mail. Such a system is described, for example, in U.S. Pat. No. 6,161,130.

SUMMARY

Systems and methods have been proposed to identify the unauthorized use of mobile voice communication systems, for example, by sampling portions of the audio communication originating from a mobile device and building an authorized user profile based on audio patterns within the audio samples. Then, subsequent audio patterns are compared with the authorized user profile to determine whether or not an authorized user is using the device. See, for example, co-pending Ser. No. 11/312,401.

Exemplary systems, methods, and programs, disclosed herein may determine language patterns within text communication, such as short text messages, for example by sampling all or part of text communications. The systems, methods, and programs may build an authorized profile based on the determined language patterns, and then evaluate all or part of subsequent text communications based on the authorized profile to determine whether a current user of the messaging device or account is the authorized user and/or whether a current sender of a communication to the messaging device or account is an imposter.

Exemplary systems, methods, and programs for generating an authorized profile for a text communication device or account, may sample one or more text communications and may store the text samples. The systems, methods, and programs may extract a language pattern from the stored text samples and may create the authorized profile based on the language pattern.

Exemplary systems, methods, and programs for detecting unauthorized use of a text communication device or account may sample a text communication, may extract a language pattern from the text sample, and may compare the extracted language pattern of the sample with an authorized profile.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

According to one or more of the following examples, short text messages may include, for example, instant messaging (IM), messages sent using the short message system (SMS), and/or e-mail messages.

According to one or more of the following examples, devices capable of sending and/or receiving short text messages may include, for example, cell phones, Personal Digital Assistants (PDAs), combination devices (e.g., voice and e-mail, internet, gaming, and/or global positing system (GPS)), personal handyphone systems (PHS), personal computers, laptop computers, and/or a client or server of a wired or wireless network such as an extranet, an internet, the Internet, and in particular the world Wide Web (WWW).

Figure 1:
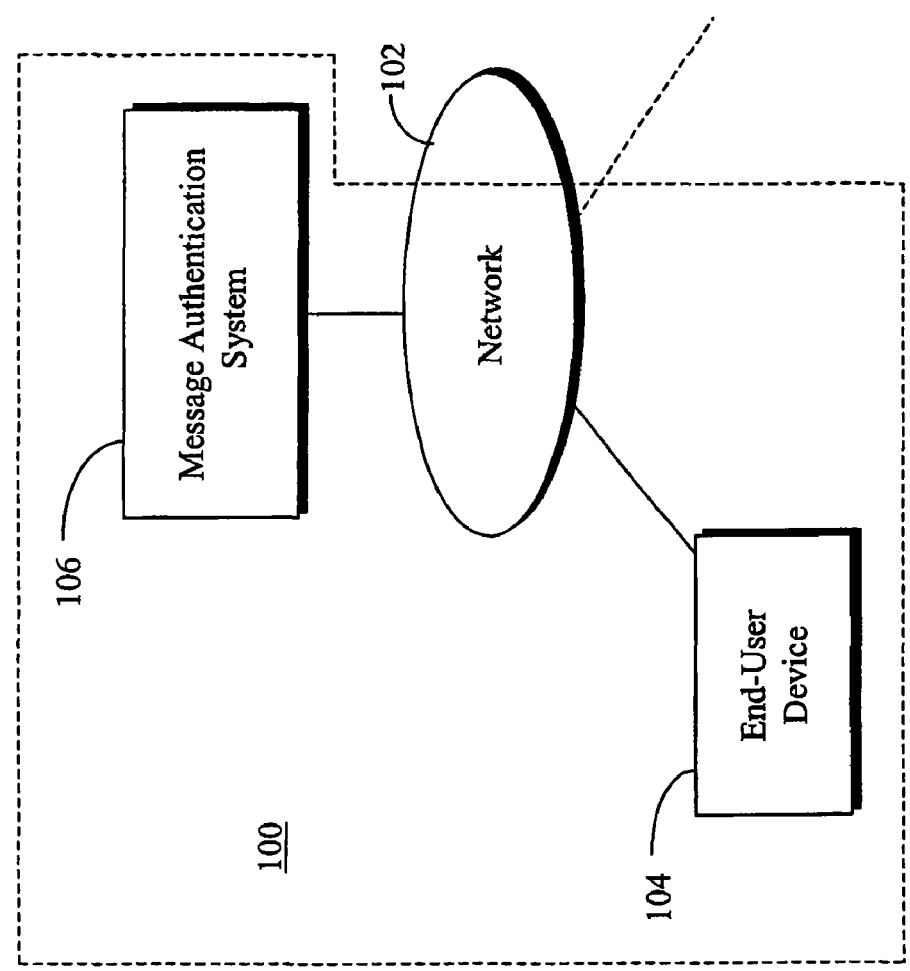
FIG. 1 shows an exemplary unauthorized use detection system.

FIG. 1 shows an exemplary communication system including an unauthorized use detection system 100. As shown in FIG. 1, the communication system may include, for example, a network 102, an end-user mobile device 104, and a message authentication system 106. As shown in FIG. 1, the unauthorized use detection system 100 may include the message authentication system 106 and all or part of the network 102.

The network may include, for example, a wired or wireless network, such as, for example, one or more of a wired telephone network, a wireless telephone network, an intranet, an extranet, a local area network, a wide area network, a storage area network, and/or the Internet. Where the network 102 is a telephone network (wired or wireless) or a large scale computer network such as the Internet, only that portion of the network 102 that receives text samples and transmits them to and/or between the message authentication system 106 and/or the end-user device 104 may be part of the system 100.

Alternatively, all or part of the message authentication system 106 may be included within the end-user device 104, in which case the network 102 need not be included in the system 100.

In general operation, the unauthorized use detection system may be based on messages sent by the end-user account or device 104. The message authentication system 106 may collect one or more text samples of a text message sent by the device 104 and may develop an authentic user profile for the user of the device. The authentic user profile may be based on one or more language patterns obtained by evaluating the one or more text samples of the primary user. The authentic user profile may then be used to determine whether or not messages sent from the end-user account or device 104 are being authored by the primary user.

Alternatively, the unauthorized use detection system 100 may be based on messages received by the end-user account or device 104. The message authentication system 106 may develop an authentic sender profile for each correspondent that the end user communicates with frequently. Each frequent correspondent may be identified by, for example, an associated address, such as an instant messaging screen name, IP address, telephone number, and/or an email address. For each correspondent's address, the message authentication system 106 may collect one or more text samples received from that address. Then, the message authentication system 106 may develop an authentic sender profile for the address based language patters obtained by evaluating the text samples received from the frequent correspondent. In this manner, as described below, the authentic sender profiles may be used by the device 104 to detect imposters attempting to send a message using a frequent correspondent's account or device.

As used herein, the term "language patterns" is intended to encompass, for example, at least one or more representations of individual or sequences of characters (alpha numeric, punctuation, white space characters, etc.), words, emoticons, icons, phrases, phonemes, syllables, and/or numbers. The language pattern may, for example, consist of a stochastic n-gram language model, or may consist of something as simple as a collection of words and phrases. The authentic user profile need not be tied to the grammar of the text message (e.g., separately evaluating the rules governing the order of the words), rather the sample may include the patterns of words, characters, etc., such as for example used in Bayesian filters. In this manner, the authentic user profile may be language independent and doesn't necessarily require complex grammar evaluation models.

A useable authentic user profile or authentic sender profile may be based on as few as one sample, a useable authentic profile may be based on a predetermined number of samples, or a developed authentic profile may be considered usable when variations between one or more of the respective language patterns included in the profile are within predetermined statistical tolerances. Furthermore, a single sample may consist of a part of a message or of the entire message. Thereby, the sampling may consist of the entire contents of all messages transmitted until the system has determined that a sufficient number of samples have been collected.

In the case in which the system 100 is based on messages sent by the end-user account or device 104, once the authentic user profile is determined, the message authentication system 106 may continue to sample text from the text messages sent by the end-user mobile device 104. For the case in which the system 100 is based on messages received by the end-user account or device 104, the message authentication system 106 may continue to sample text from the text messages received by the end-user device 104.

In either or both cases, these subsequent samples, for example, may be taken from each message, every predetermined number of transmissions, or at random. Again, a sample may consist of a part of a message or of the entire message. The message authentication system 106 may then evaluate one or more of the subsequent samples in a similar manner as above, to extract language patterns and compare the extracted language patterns with the authentic user profile to determine if the primary user authored the subsequent samples or compare the extracted language patterns with the authentic sender profile associated with the message sender's address to determine if the frequent correspondent authored the subsequent sample.

If, based on the evaluation, the message authentication system 106 determines that the primary user did not author one or more of the subsequent samples, the message authentication system 106 may determine that the end-user device 104, or the authorized user's text messaging account, is being used by an unauthorized user. If, based on the evaluation, the message authentication system 106 determines that the frequent correspondent associated with the address from which the message was sent did not author one or more of the of the subsequent samples sampled from messages originating at that address, the message authentication system 106 may determine that the frequent correspondent's account or device, is being used by an imposter.

In either or both cases, this determination may be made based on as few as one subsequent sample. Alternatively, the determination may be made if a predetermined percentage of a predetermined number of subsequent samples is determined to have been authored by an unauthorized user and/or imposter.

In the case in which the system 100 is based on messages sent by the end-user account or device 104, based on the determination that the end-user device 104, or the user's text messaging account, is being used by an unauthorized user, the device's service may be, for example, suspended and the primary user may be notified by an alternate channel that the device 104 (or password to an account) has been lost or stolen. Furthermore, if the device 104 is equipped with GPS, its location may be determined. Alternatively, the device's stationary location may be identified by an IP address. As a result, the unauthorized user's location may be provided to the user and or reported to the police.

For the case in which the system 100 is based on messages received by the end-user account or device 104, based on the determination that the frequent correspondent's end-user device or account is being used by an imposter, the user of the end-user device 104 may be alerted (for example, in a manner hidden to the imposter) that they may be communicating with an impostor. This alert may be signaled to the recipient's end-user device 104 by a text message or other alert from the message authentication system 106, or by sending a signal that, for example, opens a warning message on the recipient end-user device's screen.

Figure 2:
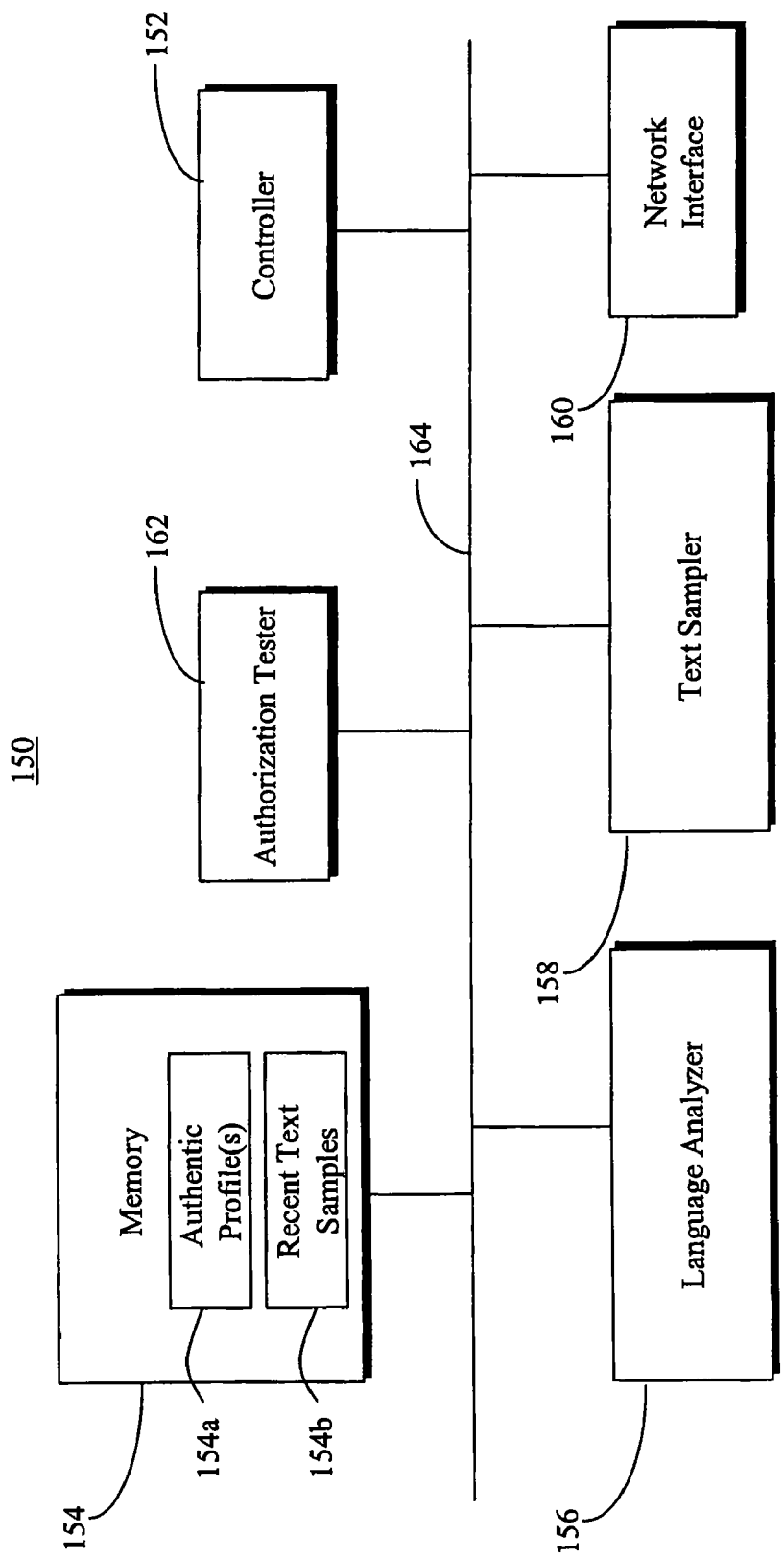
FIG. 2 shows an exemplary unauthorized use detection.

FIG. 2 shows an exemplary unauthorized use detection system 150. As shown in FIG. 2, the exemplary unauthorized use detection system 150 may physically, functionally, and/or conceptually include, for example, a controller 152, a memory 154, a language analyzer 156, a message sampler 158, a network interface 160, and/or an authorization tester 162, each, for example, appropriately interconnected by one or more data/control busses, application programming interfaces, and/or, wired or wireless network connections 160. The language analyzer 156, message sampler 158, and authorization tester 162 may be implemented using any appropriate combination of circuits, routines, and/or applications and may be appropriately combined into a single circuit routine or application or with, or as part of, the controller. Further, the language analyzer 156, message sampler 158, and authorization tester 162 may be physically, functionally, or conceptually further divided into multiple circuits, routines, or applications.

While FIG. 2 shows system 150 using bus architecture, any type of hardware architecture, including wired and wireless networks, may be used based on implementation details. For example, memory 154 and network interface 160 may be individually connected to controller 152. Also, these hardware components may be implemented using any available hardware technology such as FPGA, PAL, application specific integrated circuits (ASICs), etc.

As shown in FIG. 2 the memory may be physically, functionally, and/or conceptually divided into, for example, an authentic profile portion 154a and/or a recent text samples portion 154b. The authentic profile portion 154a may store the language patterns included in the authentic user profile and/or the authentic sender profiles. The recent text samples portion 154b may store text sampled from recent usage of the end-user device 104 or the user's text message account.

The memory 154, shown in FIG. 2, can be implemented using any appropriate combination of alterable memory and/or non-alterable memory. The alterable memory, whether volatile or non-volatile, can be implemented using any one or more of static or dynamic RAM, a removable disk and disk drive, a writeable or re-writeable optical disk and disk drive, a hard drive, and/or flash memory. Similarly, the non-alterable or fixed memory can be implemented using any one or more of ROM, PROM, EPROM, EEPROM, and/or an optical ROM disk, such as CD-ROM or DVD-ROM disk.

The language analyzer 156 may input a text sample and determine the various language patterns within the text sample. The language analyzer 156 may also compare language patterns of one text sample with the language patterns within the authentic user profile and determine whether the sample was authored by the primary user of the device and/or account or may compare language patterns of one text sample with the language patterns within the authentic sender profile and determine whether the sample was authored by an imposter.

The text sampler 158 may input, for example, a text message stream, a text message, or a packet of a concatenated message, and extract text samples representative of the message. The samples may be, for example, taken from a particular part of a message. For example at the beginning of a text message certain greetings are commonly used, thereby allowing the language patterns to be derived from a portion of the message communicating a similar user intent. However, because the system compares language patterns of a text message rather than relying on specific words, the text samples may be taken at any point in the message, irrespective of the meaning of the words written.

The network interface 160 may allow one or more of the elements of the system 150 to communicate with a network, such as for example, network 102.

In general, there are two phases of operation of the exemplary unauthorized use detection system 150: the authentic user and/or sender profile preparation phase and the unauthorized use detection phase. During the authentic user and/or sender profile preparation phase, under control of the controller 152, a text stream, message, or packet, originating from (to develop an authenticated user profile) or received by (to develop an authenticated sender profile) the end-user device 104 or the user's account is input to the text sampler 158, for example, via the network interface 160. Under control of the controller 152, the text sampler 158 samples a portion or portions of the message and stores the sampled portion(s) in the recent text samples portion 154b. Alternatively, the sampled portion(s) may be input directly into the language analyzer 156. The language analyzer 156 may access the text samples provided by the text sampler and may extract language patterns from the samples. Representations of the language patterns, under control of the controller 152, may then be stored in the authentic user/sender profile portion 145a.

In the case in which the system 150 is based on messages sent by the end-user account or device 104, the sampled text may be only that portion of the text message authored by the user. For example, only the text generated by the associated end-user device 104 may be included in the sample. Similarly, only the text generated by the user's account may be included in the sample.

For the case in which the system 150 is also or alternatively based on messages received by the end-user account or device 104, the sampled text may be only that portion of the text message authored by the party with whom the user is communicating: For example, only the text received by the associated end-user device 104 may be included in the sample. Similarly, only the text received by the user's account may be included in the sample.

Any subsequent text samples generated from subsequent messages may also stored in the recent text samples portion 154b and the language patterns extracted from the samples may be stored in, or used to update, the authentic profile portion 154a. The subsequently extracted language patterns may be separately stored for each text message, or may be used to modify the previously stored profile to develop, for example, a statistical distribution of occurrence of phrases of a given length (for example, 2 words long or 3 words long) across many samples.

The above process may be repeated by the system 150 until it is determined that the pattern representations stored in the authentic profile portion 154a are sufficient to identify the authentic user's language patterns in additional samples (when developing an authentic user profile) and/or the pattern representations stored in the authentic profile portion 154a are sufficient to identify a particular frequent correspondent's language patterns in additional samples (when developing one or more authentic sender patterns). For example, the profile(s) may be considered sufficient when a predetermined number of samples have been collected and analyzed, when the standard deviation among sampled patterns from the profile(s) is within a certain range, and/or when the number of new words or phrases detected per transmission falls below a threshold. If the language patterns were stored separately for each sample, upon the determination that the patterns are sufficient to identify the authorized user or a frequent correspondent, the patterns may be reduced, by consolidating similar patterns into a single representative pattern with associated an occurrence score. When the authentic user profile and/or one or more authentic sender profiles are created, the system 150 may enter the second phase of operation.

In the case in which the system 150 is evaluating messages sent by the end-user account or device 104, during the unauthorized use detection phase, a text stream, message, or packet, sent from the user's end-user device 104 and/or originating from the user's account are input, under control of the controller 152, to the text sampler 158. Under control of the controller 152, the text sampler 158 samples the message and stores at least one sample of the message in the recent text samples portion 154b. Alternatively, the sample(s) may be input directly to the language analyzer 156. A sample may consist of the whole or of a part of the text stream, message or packet. Under control of the controller 152, the language analyzer 156 may access a recent sample and the authentic user profile and may compare the language patterns within the recent sample to the representations of language patterns in the authentic user profile.

Under control of the controller 152, based on the comparison, the language analyzer 156 may determine whether the recent sample was authored by the authorized user. If the language analyzer 156 determines that the recent sample was not authored by the authorized user, under control of the controller 152, the sample may be stored in the recent text samples portion 154b with an indication that the sample is not authored by the authorized user. If the language analyzer 156 determines that the recent sample was authored by the authorized user, under control of the controller 152, the sample may be stored in the recent text samples portion 154b with an indication that the sample was authored by the authorized user. Alternatively, only the indication may be stored and the sample may be discarded.

When, for example, a certain number of samples and/or indications have been evaluated and stored in the recent text samples portion 152b, or a certain amount of time has passed, under control of the controller 152, the authorization tester 162 may access the stored recent samples and determine whether the authorized user has been the primary user of the mobile end-user device 104 and/or the user's text message account. The determination may be made based on, for example, whether a percentage of the stored samples that are determined to be authored by someone other than the authorized user exceeds a predetermined limit. Under control of the controller 152, the determination may be output for use by, for example, a service provider.

For the case in which the system 100 is based on messages received by the end-user account or device 104, during the unauthorized use detection phase, a text stream, message, or packet, received by the user's end-user device 104 and/or received by the user's account are input, under control of the controller 152, to the text sampler 158. Under control of the controller 152, the text sampler 158 samples the message and stores at least one sample of the message in the recent text samples portion 154b. Alternatively, the sample(s) may be input directly to the language analyzer 156. A sample may consist of the whole or of a part of the text stream, message or packet. Under control of the controller 152, the language analyzer 156 may access a recent sample and the authentic sender profile corresponding to the address from which the recent sample was sent and may compare the language patterns within the recent sample to the representations of language patterns in the authentic sender profile.

Under control of the controller 152, based on the comparison, the language analyzer 156 may determine whether the recent sample was authored by the frequent correspondent associated with the authentic sender profile. If the language analyzer 156 determines that the recent sample was not authored by the frequent correspondent, under control of the controller 152, the sample may be stored in the recent text samples portion 154b with an indication that the sample is not authored by the frequent correspondent. If the language analyzer 156 determines that the recent sample was authored by the frequent correspondent, under control of the controller 152, the sample may be stored in the recent text samples portion 154b with an indication that the sample was authored by the frequent correspondent. Alternatively, only the indication may be stored and the sample may be discarded.

When, for example, a certain number of samples have been evaluated and stored in the recent text samples portion 152b, or a certain amount of time has passed, under control of the controller 152, the authorization tester 162 may access the stored recent samples/and or indications and determine whether the frequent correspondent has been the primary message sender associated with the frequent correspondent's address. The determination may be made based on, for example, whether a percentage of the stored samples and/or indications that are determined to be authored by someone other than the frequent correspondent exceeds a predetermined limit. Under control of the controller 152, the determination may be output for use by, for example, a service provider.

Figure 3:
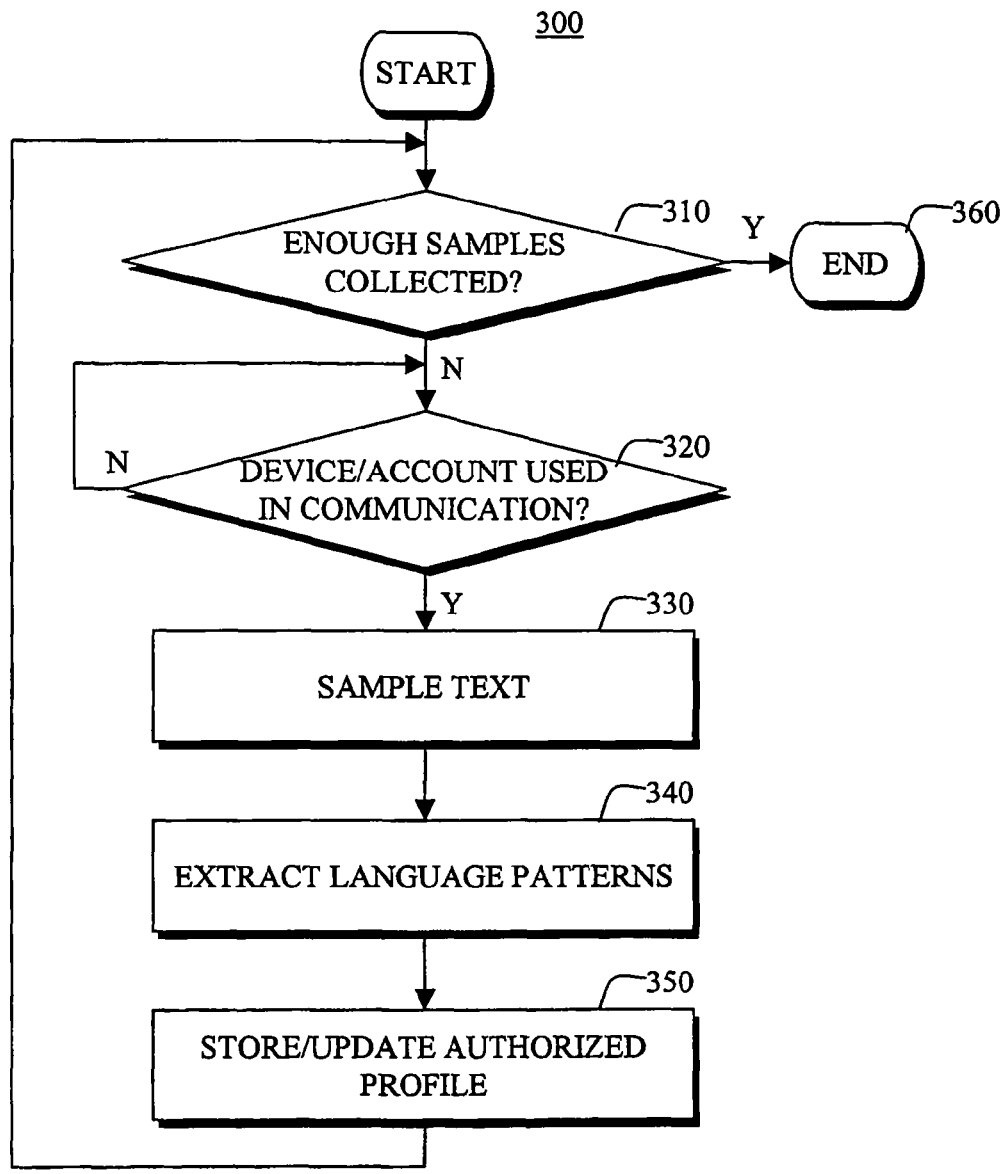
FIG. 3 shows an exemplary method for developing an authorized profile.

An exemplary method 300 for developing an authorized user profile and/or authorized sender profile is shown in FIG. 3. The exemplary method may be implemented, for example, by one or more components of the above-described systems 100, 150. However, even though the exemplary structure of the above-described systems may be referenced in the description of the method, it should be appreciated that the referenced structure is exemplary and the exemplary method need not be limited by any of the above-described exemplary structure.

As shown in FIG. 3, in step 310 it is determined whether enough text samples generated by the user device 104 (in the case of an authorized user profile) or received from a particular address (in the case of an authorized sender profile) have been collected. If enough samples have been collected, the authorized user/sender profile may be considered complete, and in step 360 operation ends. If enough samples have not been collected, operation continues to step 320. The determination of whether enough samples have been collected may be made, for example, based on the total number of samples, an elapsed time, or one or more statistical properties of the profile is within a predetermined limit. In step 320, it is determined whether the device and/or account is being used in text communication. Once the device is being used in text communication, operation continues to step 330.

In step 330, a text sample is taken from the current text communication. In a case in which an authentic user profile is being developed, for example, a text stream, message, or packet, originating from the end-user device or the user's account is sampled. In a case in which an authentic sender profile is being developed for a particular address, for example, a text stream, message, or packet, originating from the address and received by the end-user device or the user's account is sampled. Then, in step 340, the text sample is evaluated to extract language patterns within the sample. Next, in step 350, the language patterns extracted from the sample are, for example, stored to create an authorized user/sender profile or used to update an existing authorized user/sender profile. Operation of the method returns to step 310 and repeats until enough samples have been collected.

Figure 4:
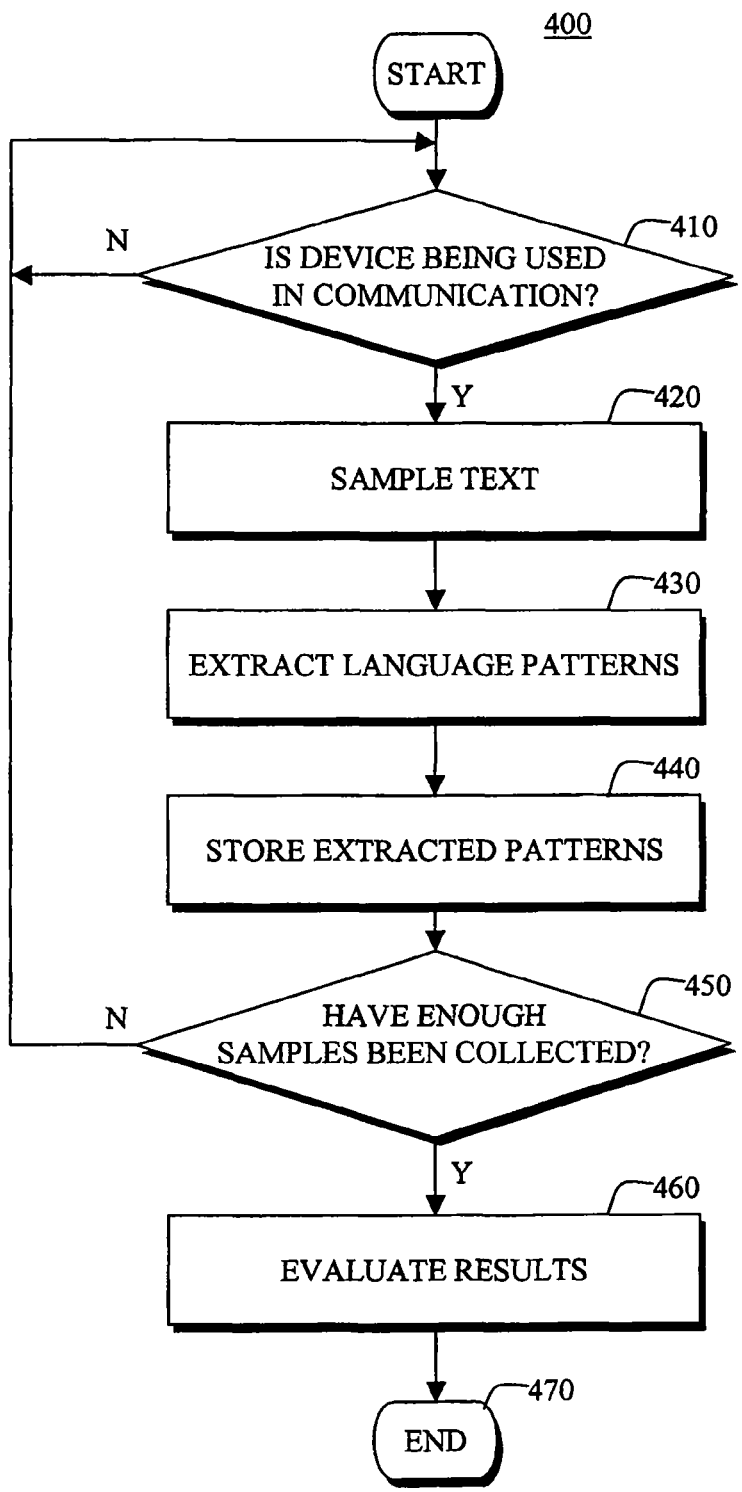
FIG. 4 shows an exemplary method of evaluating text messages.

An exemplary method 400 for evaluating text messages is shown in FIG. 4. The exemplary method may be implemented, for example, by one or more components of the above-described systems 100, 150. However, even though the exemplary structure of the above-described systems may be referenced in the description of the method, it should be appreciated that the referenced structure is exemplary and the exemplary method need not be limited by any of the above-described exemplary structure.

As shown in FIG. 4, the method begins in step 410 where it is determined whether an end-user device and/or user's account is being used in text communication. Once the device/account is being used in text communication, in step 420, a portion of the communicated text message is sampled. In the case in which a user of the end-user device is being evaluated, the text sampled will be the text generated by the end-user device and/or user's account. In the case in which the party with whom the user is communicating is being evaluated, the text sampled will be the text received by the end-user device and/or user's account. Operation continues to step 430.

In step 430, the sampled text is evaluated to extract language patterns within the sample. Then, in step 440, the language patterns extracted from the sample may be stored. In step 450, it is determined whether enough samples have been evaluated and their language patterns stored. For example, this determination may be made on the total number of samples or an amount of time that has elapsed since a previous evaluation of stored samples. If enough samples have not been collected, operation returns to step 410. If enough samples have been collected, operation continues to step 460, where the stored language patterns within the samples are compared with an authorized profile. In the case in which a user of the end-user device is being evaluated, the stored patterns are compared with the authorized user profile. In the case in which the party with whom the user is communicating is being evaluated, the stored samples are compared with the authorized sender profile corresponding to the address from which the samples were taken.

In either or both cases, for example, the number of samples that constitutes enough samples may be set to one. In this way, each sample may be compared to the authorized user/sender profile, and an evaluation of the user or sender's authenticity may be performed on each transmission.

For example, each sample's language patterns may be compared with the patterns in the authorized user profile or authorized sender profile to determine whether the sample, and thus the associated communication, was authored by the respective authorized user or frequent correspondent. The comparison may be made within certain statistical tolerances, for example, based on the reliability of the authorized user profile. For example, if the profile is rather new, that is, based on only a few samples, then the comparison may allow for a larger deviation from the profile to be considered a match. Similarly, if the profile is based on many samples, then the comparison may only allow for a smaller or no deviation from the profile to be considered a match.

Then, evaluated samples may be evaluated to determine, for example, what percentage of the total number of samples represent communications by the authorized user (in the case of evaluating the user) or, for example, what percentage of the total number of samples from a frequent correspondent's address represent communications by the frequent correspondent (in the case of evaluating the party with whom the user is communicating). In the case in which a user of the end-user device is being evaluated, if a predetermined percentage of the samples were not authored by the authorized user, then it may be determined that someone other than the authorized user is using the end-user device and/or user's text message account. In the case in which the party with whom the user is communicating is being evaluated, if a predetermined percentage of the samples were not authored by the frequent correspondent, then it may be determined that someone other than the frequent correspondent is using the frequent correspondent's device and/or text message account. In step 470, operation of the method ends.

It should be appreciated that according to the above example, once the stored samples are evaluated, they may be discarded in order for another group of samples to be collected. Alternatively, upon evaluation, only the oldest sample may be discarded. Then once the next sample is obtained and evaluated the stored samples may be evaluated, in effect creating an oldest out, newest in, rolling group of samples. Alternatively, samples may not be stored. Rather the samples may be evaluated immediately, and only the results of the evaluation may be stored.

It should also be appreciated that according to the above example, the order of the steps is not strict, and for example, the samples may each be evaluated prior to being stored.

As a result of the above exemplary systems, methods, and programs it is possible to determine the likelihood that a text message enabled end-user device and/or user account is not being used by the primary authorized user. Thus, when it is determined that the end-user device and/or account is not being used by the primary authorized user, the primary authorized user and/or the police may be notified and/or provided with the location of the device if it is equipped with a GPS receiver.

Alternatively or additionally, as a result of the above exemplary systems, methods, and programs it is possible to determine the likelihood that messages sent to a text message enabled end-user device and/or user account from a frequent correspondent's address are not being sent by the frequent correspondent. Thus, the user of the device, i.e., the message recipient, may be notified that the sender of the message may be an impostor.

However, with respect to developing an authorized user profile, it is possible that an end-user device 104 and/or text message account may have more than one authorized user. For example, it is possible that a spouse, sibling, friend, co-worker, etc. may use the device/account and the primary user may not want to be notified of their use. Accordingly, exemplary systems, methods, and programs may allow a second or subsequent user to be considered an authorized user of the device/account.

For example, an additional user authorization mode may be provided in which the second or subsequent user may actively provide text samples that will be used to create a second authorized user profile. Alternatively, upon notification that there will be a second user, the systems, methods, and programs may attempt to evaluate each sample that is obtained and, based on the samples' language patterns, group the samples by user. Then, based on the grouped samples, individual user profiles may be provided for each user. Thus, any number of users may be registered as authorized users.

It should be appreciated that the above exemplary methods and programs may be configured to evaluate only messages sent from an associated end-user device 104 or account, to evaluate only messages received by an associated end-user device 104 or account, or to evaluate both messages sent from and received by an associated end-user device 104 or account.

It should also be appreciated that the authentic user profile and/or authentic sender profiles need not be stored within the end-user device. Rather the profiles may be stored, for example, on a server operated by a message service provider and connected to the network 102. In this respect, an authentic user profile for the end-user device 104 or account may be used as an authentic sender profile for another device with which the end-user device 104 or account communicates, and/or the authentic user profile for another device or account with which the end-user device 104 or account communicates may be used as an authentic sender profile for the end-user device 104 or account.

Furthermore, even if the authentic user profiles are stored within the end-user devices, a stored authentic user profile associated with a sender device may be for example, sent in the background along with a message from that device, or accessed by a recipient device, and then stored and/or used as an authentic sender profile by the recipient device.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A method for detecting unauthorized user account communications, comprising:

sampling beginning portions of messages, sent from a user account, associated with a first authorized user to obtain a first plurality of message samples;

extracting first respective language patterns from the first plurality of message samples;

creating a first authorized profile based on the first respective language patterns;

sampling a beginning portion of a recent message sent from the user account to obtain a recent message sample;

extracting a language pattern from the recent message sample; and comparing the language pattern extracted from the recent message sample to the first authorized profile according to an allowable amount of deviation between the language pattern extracted from the recent message sample and the first authorized profile to determine whether the recent message is an unauthorized user account communication, the allowable amount of deviation based on an amount of message samples in the first plurality of message samples.

2. The method of claim 1, further comprising:
in response to receiving a notification of a second authorized user associated with the user account, sampling beginning portions of messages, sent from the user account, associated with the second authorized user to obtain a second plurality of message samples;
extracting second respective language patterns from the second plurality of message samples; and
creating a second authorized profile based on the second respective language patterns.

3. The method of claim 1, further comprising:
in response to determining the recent message is an unauthorized user account communication, notifying a recipient of the recent message that the recent message is an unauthorized user account communication.

4. The method of claim 1, wherein the user account is a text message user account associated with a first end-user device.

5. The method of claim 4, wherein the first end-user device is equipped with a global positioning system receiver, the method further comprising:
upon determining the recent message is an unauthorized text message; determining a location of the first end-user device via the global positioning system receiver; and
creating a notification providing the location of the first end-user device.

6. The method of claim 4, further comprising:
sending the first authorized profile from the first end-user device to a second end-user device to be used by the second end-user device to determine whether the second end-user device is receiving text messages from an authorized user of the text message user account associated with the first end-user device.

7. The method of claim 1, further comprising:
determining a primary user of the user account is not an authorized user of the user account when a percentage of unauthorized user account communications exceeds a predetermined limit.

8. A tangible computer readable memory storing computer program instructions for detecting unauthorized user account communications, which, when executed on a processor, cause the processor to perform operations comprising:
sampling beginning portions of messages, sent from a user account, associated with a first authorized user to obtain a first plurality of message samples;
extracting first respective language patterns from the first plurality of message samples;
creating a first authorized profile based on the first respective language patterns;
sampling a beginning portion of a recent message sent from the user account to obtain a recent message sample;
extracting a language pattern from the recent message sample; and
comparing the language pattern extracted from the recent message sample to the first authorized profile according to an allowable amount of deviation between the language pattern extracted from the recent message sample and the first authorized profile to determine whether the recent message is an unauthorized user account communication, the allowable amount of deviation based on an amount of message samples in the first plurality of message samples.

9. The tangible computer readable memory of claim 8, the operations further comprising:
in response to receiving a notification of a second authorized user associated with the user account, sampling beginning portions of messages, sent from the user account, associated with the second authorized user to obtain a second plurality of message samples;
extracting second respective language patterns from the second plurality of message samples; and
creating a second authorized profile based on the second respective language patterns.

10. The tangible computer readable memory of claim 8, the operations further comprising:
in response to determining the recent message is an unauthorized user account communication, notifying a recipient of the recent message that the recent message is an unauthorized user account communication.

11. The tangible computer readable memory of claim 8, wherein the user account is a text message user account associated with a first end-user device.

12. The tangible computer readable memory of claim 11, wherein the first end-user device is equipped with a global positioning system receiver, the operations further comprising:
upon determining the recent message is an unauthorized text message; determining a location of the first end-user device via the global positioning system receiver; and
creating a notification providing the location of the first end-user device.

13. The tangible computer readable memory of claim 11, the operations further comprising:
sending the first authorized profile from the first end-user device to a second end-user device to be used by the second end-user device to determine whether the second end-user device is receiving text messages from an authorized user of the text message user account associated with the first end-user device.

14. The tangible computer readable memory of claim 8, the operations further comprising:
determining a primary user of the user account is not an authorized user of the user account when a percentage of unauthorized user account communications exceeds a predetermined limit.

15. An apparatus comprising:
a memory storing computer program instructions;
a processor communicatively coupled to the memory, the processor configured to execute the computer program instructions, which, when executed on the processor, cause the processor to perform operations comprising:
sampling beginning portions of messages, sent from a user account, associated with a first authorized user to obtain a first plurality of message samples;
extracting first respective language patterns from the first plurality of message samples;
creating a first authorized profile based on the first respective language patterns;
sampling a beginning portion of a recent message sent from the user account to obtain a recent message sample;
extracting a language pattern from the recent message sample; and
comparing the language pattern extracted from the recent message sample to the first authorized profile according to an allowable amount of deviation between the language pattern extracted from the recent message sample and the first authorized profile to determine whether the recent message is an unauthorized user account communication, the allowable amount of deviation based on an amount of message samples in the first plurality of message samples.

16. The apparatus of claim 15, the operations further comprising:

in response to receiving a notification of a second authorized user associated with the user account, sampling beginning portions of messages, sent from the user account, associated with the second authorized user to obtain a second plurality of message samples;

extracting second respective language patterns from the second plurality of message samples; and creating a second authorized profile based on the second respective language patterns.

17. The apparatus of claim 15, the operations further comprising:

in response to determining the recent message is an unauthorized user account communication, notifying a recipient of the recent message that the recent message is an unauthorized user account communication.

18. The apparatus of claim 15, wherein the user account is a text message user account associated with a first end-user device.

19. The apparatus of claim 18, wherein the first end-user device is equipped with a global positioning system receiver, the operations further comprising:

upon determining the recent message is an unauthorized text message; determining a location of the first end-user device via the global positioning system receiver; and creating a notification providing the location of the first end-user device.

20. The apparatus of claim 15, the operations further comprising:

determining a primary user of the user account is not an authorized user of the user account when a percentage of unauthorized user account communications exceeds a predetermined limit.

\* \* \* \* \*